United States Patent [19]

Coquard et al.

[11] Patent Number: 4,717,763

[45] Date of Patent: Jan. 5, 1988

[54] BLOCK COPOLYETHERAMIDES FLEXIBLE AT LOW TEMPERATURES

[75] Inventors: Jean Coquard, Craponne; Jean Goletto, Ecully, both of France

[73] Assignee: Rhone-Poulenc Specialites Chimiques, Courbevoie, France

[21] Appl. No.: 807,647

[22] Filed: Dec. 11, 1985

[30] Foreign Application Priority Data

Dec. 11, 1984 [FR] France .............. 84 19100

[51] Int. Cl.$^4$ .............................. C08G 69/14
[52] U.S. Cl. .................... 528/324; 528/313; 528/317
[58] Field of Search ............ 528/324, 313, 317

[56] References Cited

U.S. PATENT DOCUMENTS

| | | |
|---|---|---|
| 3,240,732 | 3/1966 | Ham ........................ 528/324 |
| 3,397,107 | 8/1968 | Kimura ..................... 528/324 |
| 4,024,116 | 5/1977 | Horn ........................ 528/324 |
| 4,218,351 | 8/1980 | Rasmussen ............... 260/18 N |
| 4,356,300 | 10/1982 | Isler ........................ 528/324 |
| 4,581,440 | 4/1986 | Coquard ................... 528/324 |

FOREIGN PATENT DOCUMENTS

| | | | |
|---|---|---|---|
| 0025487 | 3/1981 | European Pat. Off. ........... 528/324 |
| 0130927 | 1/1985 | European Pat. Off. ........... 528/324 |
| 2548196 | 1/1985 | France . | |
| 43-28837 | 11/1968 | Japan ..................... 528/324 |
| 45-26509 | 9/1970 | Japan ..................... 528/324 |
| 59-131628 | 7/1984 | Japan ..................... 528/324 |
| 1169276 | 11/1969 | United Kingdom ................ 528/324 |

Primary Examiner—C. Warren Ivy
Attorney, Agent, or Firm—Burns, Doane, Swecker & Mathis

[57] ABSTRACT

Homogeneous, flexible block copolyetheramides having a melting/softening point of at least 170° C., a glass transition temperature, measured at ZHE, of at most $-5°$ C., and a melt viscosity of at least 500 poises, said block copolyetheramides comprising the oxyacid, or alkali or alkaline earth metal, such oxyacid salt catalyzed polycondensate of admixture of (i) a lactam having from 4 to 12 carbon atoms with (ii) a solution of (iii) a salt of a fatty acid dimer and a polyoxyalkylenediamine, or mixture thereof, with a triamine, in (iv) a solvent medium which comprises (1) a mixture of water and an aliphatic alcohol having less than 5 carbon atoms, (2) a water/alcohol/lactam mixture wherein the alcohol and lactam are as in (1), (3) a melt of said lactam, or (4) a mixture of water and a water-soluble such lactam, the stoichiometry of said salt (iii) having been carefully pre-adjusted such that the pH thereof is essentially that as exists at the equivalence point thereof, and said oxyacid comprising at least one acid function having a pKa of no greater than 4.

27 Claims, No Drawings

BLOCK COPOLYETHERAMIDES FLEXIBLE AT LOW TEMPERATURES

BACKGROUND OF THE INVENTION

1. Field of the Invention

The present invention relates to the preparation of homogeneous block copolyetheramides which are flexible at low temperatures, have high melting points and low glass transition temperatures, and the melt viscosities of which are such as to permit the facile shaping thereof, e.g., by injection molding.

2. Description of the Prior Art

In published French Application No. 83/10,939, assignee to the assignee hereof, novel homogeneous block copolyetheramides are described having, in particular, a high crystallinity as to provide high melting points and good thermo-mechanical resistance, a glass transition temperature which is as low as possible as to impart high flexibility and elasticity at temperatures as low as those equal to or below $-20°$ C., and a high melt viscosity compatible with the facile shaping thereof, e.g., in the fields of injection molding and extrusion.

The prior art noted in the aforesaid '939 French application includes U.S. Pat. No. 4,218,351, which describes thermoplastic elastomers consisting of copolyetheramides. The focus of this patent is a general class of copolyetheramides which are produced by direct reaction among three types of components, each having functional groups capable of taking part in a reaction for the formation of amide groups. The first component (i) is selected from among a short-chain dicarboxylic acid, a short-chain diamine, a short-chain lactam, a short-chain aminoacid and a mixture of two or more of these species with each other; the second component (ii) is a fatty acid dimer or an amino derivative of a fatty acid dimer; the third component (iii) is a polyoxyalkylenediamine or a polyoxyalkylenedicarboxylic acid. The components taking part in the reaction are selected such as to contribute substantially equal amounts of NH$_2$ and COOH groups to the reaction medium. From the examples in said '351 patent, it will be noted that the copolyetheramides which are actually prepared are essentially produced by reaction (i) of a mixture of a short-chain diacid or a short-chain diamine or a mixture of a lactam and a short-chain diacid or a short-chain diamine with a reactant of type (ii) and a reactant of type (iii). The copolyetheramides prepared in this manner have interesting properties, especially low-temperature flexibility, which is responsible for the good resilience properties attributed thereto. However, their low melt viscosity, which is generally below 100 poises at 232° C., does not permit them to be used as adhesives. Now, in the fields of plastics molding and extrusion there is a need for materials having a sufficiently high melt viscosity to enable same to be injection molded or extruded in a suitable manner. The prior art is conspicuously silent as regards means for the preparation, beginning with the reaction mixtures in accordance with the teaching of said '351 patent, of copolyetheramides having a sufficiently high melt viscosity as to be useful as technical plastics.

The French Application No. 83/10,939 features copolyetheramides for the purpose of providing polymers for molding and extrusion, having a high melt viscosity, and additionally having a high flexibility down to temperatures as low as those equal to or below $-20°$ C.

More specifically, said '939 French application features homogeneous block copolyetheramides having, in particular, a melting or softening point of at least 170° C., a glass transition temperature measured at ZHE not exceeding $-5°$ C. and a melt viscosity of at least 500 poises, said copolyetheramides being prepared according to the following operating procedure, in which:

(a) a lactam containing from 4 to 12 carbon atoms is mixed with a solution of a salt of a fatty acid dimer and a polyoxyalkylenediamine in a solvent medium based on a mixture of water with an aliphatic alcohol containing fewer than 5 carbon atoms, a water/alcohol/lactam mixture (both the alcohol and the lactam employed being as above defined) and of the lactam itself in a molten state or, when the lactam is water-soluble, a water/lactam mixture;

(b) the stoichiometry of the said salt has been established beforehand by measuring the pH of the salt solution in a solvent mixture based on water and at least one compound selected from among an aliphatic alcohol, an aliphatic diol or a lactam (both the alcohol and the lactam employed also being as above defined, the aliphatic diol containing from 2 to 6 carbon atoms) and by adjusting the composition of the said salt such that the pH attains, within $\pm 0.05$ pH unit, the pH value at the equivalence point, the mixing of the salt solution with the lactam being capable of being omitted when the solution of salt in the solvent medium based on a water-/alcohol/lactam mixture, a water/lactam mixture or the lactam itself in the molten state contains sufficient lactam to produce the copolyetheramide of the required composition;

(c) a catalyst consisting of an inorganic oxyacid or an organic oxyacid other than a carboxylic acid, at least one of the acid groups of which, when there are more than one, has an ionization constant pKa in water at 25° C. equal to or below 4, is then added to the reaction mixture; and (d) the entire reaction mass is then subjected to heating to cause the lactam to react with the salt.

Referring to melt viscosity, said '939 French application indicates that it is measured at 230° C., under a shear gradient of 10 s$^{-1}$ using a Davenport rheometer in the case of copolyetheramides produced from lactams containing 6 to 12 carbon atoms; in the case of copolyetheramides produced from lactams containing 4 to 5 carbon atoms, the melt viscosity is measured as indicated above, but at 260° C.

SUMMARY OF THE INVENTION

It has now surprisingly been found that homogeneous block copolyetheramides having the properties referred to in said '939 French application may be produced by conducting an operating procedure which is modified in respect of the definition of the amino compound which serves to form the salt, to which reference is made in step (a), and/or in respect of the definition of the catalyst, to which reference is made in step (c), and/or in respect of the time of the addition of catalyst.

More specifically, the present invention features homogeneous block copolyetheramides having, in particular, a melting or softening point of at least 170° C., a glass transition temperature measured at ZHE not exceeding $-5°$ C. and a melt viscosity of at least 500 poises, said copolyetheramides being prepared by:

(a') mixing a lactam containing from 4 to 12 carbon atoms with a solution of a salt of a fatty acid dimer and a suitable amino compound in a solvent medium based on a mixture of water with an aliphatic alcohol containing fewer than 5 carbon atoms, a water/alcohol/lactam mixture (both the alcohol and the lactam employed being as above defined), the lactam itself in a molten state, or, when the lactam is water-soluble, a water/lactam mixture;

(b') establishing beforehand the stoichiometry of the said salt by measuring the pH of the solution of the salt in a diluent mixture based on water and at least one compound selected from among an aliphatic alcohol, an aliphatic diol or a lactam (both the alcohol and the lactam employed also being as above defined, the aliphatic diol containing from 2 to 6 carbon atoms) and by adjusting the composition of the said salt such that the pH attains, within ±0.05 pH unit, the pH value at the equivalence point, the mixing of the salt solution with the lactam being capable of being omitted when the solution of the salt in the solvent medium based on a water/alcohol/lactam mixture, a water/lactam mixture or the lactam itself in a molten state, contains sufficient lactam to produce the copolyetheramide of the required composition;

(c') adding a catalyst to the reaction mixture; and (d') heating the entirety of the reaction mixture to effect reaction of the lactam with the salt; and the subject copolyetheramides being characterized in that, in the step (a'), a salt of a fatty acid dimer and of a mixture of a polyoxyalkylenediamine with a triamine is used, and that in step (c') a catalyst is used which is either an alpha compound, or a beta compound, with "alpha" connoting an inorganic oxyacid or an organic oxyacid other than a carboxylic acid, at least one of the acid groups of which, when there are more than one, having an ionization constant pKa in water at 25° C. equal to or below 4, and "beta" connoting an alkali metal salt or an alkaline-earth metal salt of this acid.

The present invention also features copolyetheramides having the properties hereinbefore outlined, which are produced utilizing the operating procedure comprising the said steps (a') to (c'), but said copolyetheramides being characterized in that in the step (a') for the production thereof, a salt of a fatty acid dimer and of a polyoxyalkylenediamine, without a triamine, is used, and that in the step (c') a catalyst is used which is a beta compound.

DETAILED DESCRIPTION OF THE INVENTION

More particularly according to the present invention, copolyetheramides having the properties set forth herein and in said '939 French application are produced by adding the catalyst (alpha) or (beta) to the reaction mixture comprising the salt of a fatty acid dimer and the amino compound, the stoichiometry of which has been preliminarily or previously established. It has been found that it may be advantageous, especially when the catalyst is a strong inorganic or organic oxyacid, to add the catalyst to the starting solution of the salt of a fatty acid dimer and of the amino compound and to then carry out the adjustment of the stoichiometric ratio. The present invention consequently also features copolyetheramides having such properties stated prepared by:

(a") mixing a lactam containing from 4 to 12 carbon atoms with a solution of a salt of a fatty acid dimer and of a suitable amino compound in a solvent medium based on a mixture of water and an aliphatic alcohol containing fewer than 5 carbon atoms, a water/alcohol/lactam mixture (both the alcohol and the lactam employed being as above defined), the lactam itself in a molten state, or, when the lactam is water-soluble, a water/lactam mixture;

(b") establishing the stoichiometry of the said solution beforehand by measuring the pH of the solution in a diluent mixture based on water and at least one compound selected from among an aliphatic alcohol, an aliphatic diol or a lactam (both the alcohol and the lactam employed also being as above defined, the aliphatic diol containing from 2 to 6 carbon atoms) and adjusting the composition such that the pH attains, within ±0.05 pH unit, the pH value at the equivalence point, the mixing of the solution of the salt with the lactam being capable of being omitted when the solution of the salt in the solvent medium based on a water/alcohol/lactam mixture, a water/lactam mixture or lactam itself in a molten state contains sufficient lactam to produce the copolyetheramide of the required composition;

(c") reacting the lactam with the salt by heating the reaction mixture in the presence of a catalyst; the product copolyetheramides being characterized in that the catalyst is added in the solution of the salt of the fatty acid dimer and of the amino compound prior to adjustment of the stoichiometry of the said solution, the amino compound consisting of a polyoxyalkylenediamine either alone or admixed with a triamine and the catalyst either being an alpha compound, or a beta compound.

The triamines which may be used according to the present invention are diprimary, secondary or triprimary aliphatic polyamines optionally comprising one or more ether bridges containing at least 8 carbon atoms. Exemplary of such triamines, especially representative are bis-hexamethylenetriamine having the formula:

and the polyoxyalkylenetriamines having the general formula:

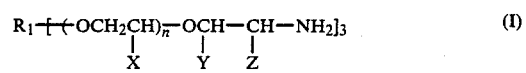

in which $R_1$ is a trivalent radical which is the residue of a trihydroxylated aliphatic alcohol capable of being polyoxyalkylated, containing from 3 to 10 carbon atoms; Z is a straight or branched-chain alkyl radical containing 1 to 18 carbon atoms; X and Y, which are identical or different, are each a hydrogen atom or a radical Z; and the symbol n denotes an average number ranging from 0 to 50.

These polyoxyalkylenetriamines may be prepared by known processes, such as that described in U.S. Pat. No. 3,654,370.

The triamines which are preferred for carrying out the present invention are the polyoxypropylenetriamines having the formula (I) given above, in which $R_1$ is as defined above; Z is a methyl radical; X denotes Z; Y is a hydrogen atom and n has an average value ranging from 1 to 16.

The triamines which are particularly preferred are the polyoxypropylenetriamines having the formula:

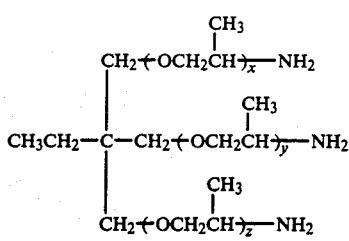

(II)

in which ($R_1$ is thus the trimethylolpropane residue) the symbols x, y and z each denote an average number ranging from 1 to 10, with the sum of $x+y+z$ ranging from 3 to 30.

The triamines which are most particularly preferred are the polyoxypropylenetriamines derived from trimethylolpropane in which the sum $x+y+z$ ranges from 5 to 10.

The proportions of a triamine which are used, when its use is required, expressed as the number of millimoles of triamine per 1 kilogram of final copolyetheramide, generally range from 0.1 to 20, preferably from 1 to 10.

As regards the strong inorganic or organic oxyacid (alpha) which may be used, representative is, as indicated in the French Application No. 83/10,939, an oxygen-containing mono- or polyacid, at least one of the acid groups of which has an ionization constant pKa in water at 25° C. equal to or below 4.

Suitable strong acids which are exemplary are:

(i) among the inorganic oxyacids: sulfurous, sulfuric, hypophosphorous, phosphorous, orthophosphoric or pyrophosphoric acids;

(ii) among the organic oxyacids: the organosulfonic acids of the formula $R_2$—$SO_3H$ (III) in which $R_2$ is a straight or branched-chain alkyl radical containing from 1 to 6 carbon atoms, a phenyl radical optionally substituted by 1 to 3 alkyl radicals containing from 1 to 3 carbon atoms, a phenylalkyl radical containing from 1 to 3 carbon atoms in the alkyl moiety and whose benzene nucleus may optionally be substituted by 1 to 3 alkyl radicals containing from 1 to 3 carbon atoms, or a naphthyl radical optionally substituted by 1 to 4 alkyl radicals containing from 1 to 3 carbon atoms; the organophosphonic acids of the formula $R_3$—$P(O)(OH)_2$ (IV) in which $R_3$ is an alkyl radical, a phenyl radical or a phenylalkyl radical, each of such radicals having the same definition as given above for $R_2$; the organophosphinic acids of the formula $R_4R_5$—$P(O)(OH)$ (V) in which $R_4$ and $R_5$, which are identical or different, are each a straight-chain alkyl radical containing from 1 to 3 carbon atoms, a phenyl radical or a phenylalkyl radical, each of these latter two radicals having the same definition as given above for $R_2$; and the organophosphonous acids of the formula $R_6H$—$P(O)(OH)$ (VI) in which $R_6$ is a straight or branched-chain alkyl radical containing from 1 to 4 carbon atoms (branching being excluded for an alkyl radical containing 4 carbon atoms), a phenyl radical or a phenylalkyl radical, each of these latter two radicals having the same definition as given above for $R_2$.

It is preferable to use as a strong acid (alpha) the acids derived from phosphorus and especially hypophosphorous, phosphorous, orthophosphoric, pyrophosphoric, methylphosphonic, phenylphosphonic, benzylphosphonic, dimethylphosphinic, diphenylphosphinic, methylphenylphosphinic, dibenzylphosphinic, methylphosphonous, phenylphosphonous or benzylphosphonous acids.

With respect to the acid salt (beta), salts of alkali metals or of alkaline earth metals derived from inorganic or organic oxyacids (alpha) are typically used.

As a salt (beta) it is preferable to use those which are completely soluble in the reaction mixture. Among these preferred salts (beta), the sodium and potassium salts derived from the particular suitable types of inorganic or organic oxyacids (alpha) referred to above, are suitable. The salts (beta) which are most particularly suitable are the sodium and potassium salts derived from the preferred acids derived from phosphorus and particularly mentioned above.

The proportions of strong acid (alpha) or salt (beta), expressed as a weight percentage relative to the final copolyetheramide, typically range from 0.01 to 1% and preferably from 0.01 to 0.5%.

The general conditions for carrying out the present invention are those described in the aforesaid '939 French application and repeated below.

By way of illustration of the lactams which are suitable, exemplary are: γ-butyrolactam, δ-amylolactam, ε-caprolactam, oenantholactam, capryllactam, 2-azacycloundecanone, 2-azacyclododecanone and laurolactam. The preferred lactam is ε-caprolactam; the reactant employed then has the same characteristics as those of the reactant used for the industrial production of polycaprolactam or nylon 6.

The dimer acids employed are produced by polymerization of compounds comprising 8% to 100% by weight of monomeric fatty acid(s) containing from 16 to 20 carbon atoms and 20% to 0% by weight of monomeric fatty acid(s) containing from 8 to 15 carbon atoms and/or from 21 to 24 carbon atoms. By the term "monomeric fatty acids" are intended saturated or unsaturated, straight or branched-chain aliphatic monoacids.

Among the saturated straight or branched-chain monomeric fatty acids, exemplary are: caprylic, pelargonic, capric, lauric, myristic, palmitic and isopalmitic, stearic, arachidic, behenic and lignoceric acids.

Among the straight or branched-chain monomeric fatty acids containing ethylenic unsaturation(s), exemplary are: 3-octenoic, 11-dodecenoic, oleic, lauroleic, myristoleic, palmitoleic, gadoleic, cetoleic, linoleic, linolenic, eicosatetraenoic and chaulmoogric acids. Some acids containing acetylenic unsaturation can also produce polymeric acids, but they are not found in appreciable quantities in the natural state and consequently their economic interest is quite low.

The polymeric fatty acids produced by thermal polymerization, optionally in the presence of catalysts such as peroxides or Lewis acids, may be fractionated, for example, using such traditional methods as vacuum distillation or solvent extraction. They can also be hydrogenated to reduce their degree of unsaturation and thus to reduce their extent of coloration.

In accordance with the aforesaid '939 French application, the dimer acids which are preferably used are fractionated polymeric fatty acids in which the difunctional acid fraction is greater than 94% by weight, the monofunctional acid fraction is below 1% by weight and still more preferably equal to or below 0.5% by weight, the fraction of acid of functionality greater than 2 is below 5% by weight and still more preferably equal to or below 3% by weight.

Still more preferably, the dimer acids employed are the species produced by fractionation (resulting in the fractions indicated above) of polymeric fatty acids which have additionally been subjected to hydrogenation.

The dimer acids which are very particularly preferred are, also as indicated in said '939 French application, the species produced by fractionation of a hydrogenated composition produced by catalytic polymerization of monomeric fatty acid(s) containing 18 carbon atoms. In this context, oleic, linoleic and linolenic acids, taken alone, or in pairs thereof, or preferably in the form of a ternary mixture, are the most particularly preferred starting materials for the preparation of the polymeric fatty acids, because of their ready availability and their relatively straightforward polymerization.

Another reactant employed comprises the polyoxyalkylenediamines. Again as noted in said '939 French application, these compounds may be represented by the general formula:

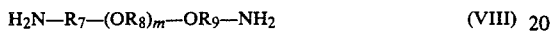

$$H_2N-R_7-(OR_8)_m-OR_9-NH_2 \qquad (VIII)$$

in which the symbols $R_7$, $R_8$, $R_9$, which are identical or different, are each divalent, straight or branched-chain saturated aliphatic radicals containing from 1 to 10 carbon atoms and the symbol m is a number determined such as to provide a molecular weight ranging from 100 to 10,000 and, preferably, ranging from 300 to 5,000.

By way of illustration of polyoxyalkylenediamines which are suitable, representative are:

(i) polyoxypropylenediamines of the formula (VII) in which:

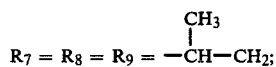

$$R_7 = R_8 = R_9 = -\overset{\overset{\displaystyle CH_3}{|}}{C}H-CH_2;$$

(ii) polyoxyethylenediamines of the formula (VII) in which:

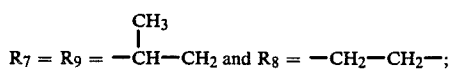

$$R_7 = R_9 = -\overset{\overset{\displaystyle CH_3}{|}}{C}H-CH_2 \text{ and } R_8 = -CH_2-CH_2-;$$

(iii) or polyoxytetramethylenediamines of the formula (VII) in which:

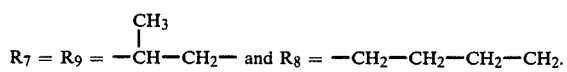

$$R_7 = R_9 = -\overset{\overset{\displaystyle CH_3}{|}}{C}H-CH_2- \text{ and } R_8 = -CH_2-CH_2-CH_2-CH_2.$$

Naturally, as indicated in said French application, it is possible to use a mixture of two or more polyoxyalkylenediamines.

The process for preparing the copolyetheramides according to the present invention comprises producing, in a first stage, a solution, in a suitable solvent medium, of a salt of fatty acid dimer and of polyoxyalkylenediamine, either alone or admixed with a triamine (said solution either containing or not containing the catalyst), the stoichiometry of which will then be monitored and adjusted by pH-metering before it is used in the polycondensation reaction with the lactam (after the catalyst has been added, where appropriate, when the starting solution does not contain it).

As mentioned above, the solvent medium for the salt in question and, if appropriate, for the catalyst, may consist of a water/alcohol mixture (A), a water/alcohol/lactam mixture (B), or molten lactam (C) or, when the selected lactam is itself water-soluble, of a water/lactam mixture (D). The lactam which may then be used is advantageously the same as that selected as a polycondensation reactant. With respect to the water content of the solvent media (A) and (D) and to the concentration of the salt in the media (A), (C) and (D), it is appropriate to refer, as per the '939 French application, to French Pat. No. 2,407,227, also assigned to the assignee hereof, at pages 2 and 3. It will be appreciated that small changes in relation to the teaching of this prior art may take place in respect of the definition of the boundaries within which lie the values of the water content of the solvent media and of the concentration of the salt of fatty acid dimer and of the amino compound; these small changes are substantially attributable to the fact that, in the present invention, on the one hand the salt is prepared from a polyoxyalkylenediamine, either alone or mixed with a triamine, while in the prior art in question, the salt is prepared from hexamethylenediamine, and, on the other hand, a lactam other than caprolactam may be used. However, one skilled in this art can easily determine these small changes using any one of a number of simple tests. As per the solvent medium (B), although this is not explicitly described in the aforenoted '227 French patent, its composition is readily apparent therefrom, in the light hereof.

With reference to the method of adjusting the stoichiometry of the salt solutions either containing or not containing the catalyst, reference is again made to said French Pat. No. 2,407,227. As indicated on page 3 of this patent, the preferred solvent mixtures used to dilute the salt solution, whether or not containing the catalyst, with a view to carrying out the pH measurements, are binary mixtures such as, for example, water/alcohol, water/diol or water/(water-soluble) lactam mixtures, but it is also possible to use ternary mixtures such as, for example, water/alcohol/lactam or water/diol/lactam mixtures, in particular in the case where the lactam selected is water-insoluble. On the subject of the composition of the diluent mixtures which can be employed, this is the same as that indicated in the referenced prior art, with the appearance, if appropriate, of small changes in respect of the definition of the limits within which fall the corresponding proportions of each component of these diluent mixtures, these small changes being substantially connected, as indicated before, with the use of a salt of a different kind and, where applicable, the use of a lactam other than caprolactam, and which can be readily determined by one skilled in this art using simple tests.

When the lactam-type reactant employed is ε-caprolactam, and this corresponds, as heretofore stated, to a preferred embodiment, a solvent medium which is particularly recommended for preparing the solution of the salt of fatty acid dimer and of a polyoxyalkylenediamine taken either alone or mixed with a triamine (whether or not said solution contains the catalyst) consists of water/ε-caprolactam mixtures having a water content of from 40 to 80% by weight; with regard to the pH determination of the solution, this is carried out in a highly preferred manner in water/isopropanol diluent mixtures having a water content of from 20 to 60% by weight.

The salt solution (whether or not containing the catalyst), the stoichiometry of which has been strictly monitored and adjusted, is mixed with suitable quantities of lactam (and, where applicable, of catalyst when the starting solution does not contain the catalyst), and then the polycondensation of the various monomers involved (lactam, dimer acid and diamine containing ether bridges, taken alone or mixed with a triamine in the form of salt) is carried out.

Also as indicated in the '939 French application, the polycondensation of the various monomers involved is first carried out by gradually raising the temperature of the reaction mixture to from 130° C. to 280° C. while operating under atmospheric pressure and by providing for uniform distillation of the water of polycondensation together with, where applicable, the water and, also where appropriate, the alcohol comprising a fraction of the solvent medium for the salt. The polycondensation is continued by maintaining, after distillation, the melt at the aforementioned temperatures for a period of time which can vary from approximately 15 minutes to approximately 2 hours. The polycondensation is completed by then producing a reduced pressure such as to gradually attain a value below $200 \cdot 10^2$ Pa and by maintaining the polycondensation medium at the aforementioned temperatures for a period of time which can vary from approximately 15 minutes to approximately 2 hours; this latter stage under reduced pressure presents the advantage of making it possible to remove a large portion of the monomers which have not been polycondensed.

The copolyetheramides produced can, of course, be modified by adding, for example, into their polymerization medium one or more additives such as, in particular, stabilizers and inhibitors of degradation by oxidation, ultraviolet light or heat; lubricants, colorants, nucleating agents, antifoam agents, and the like.

In the copolyetheramides according to the present invention, the crystallinity and, consequently, the cohesion and the ease of obtaining high melting points and good thermomechanical properties are contributed by the amide blocks; by an "amide block" there is intended essentially the concatenation of segments of the formula (VIII) which are derived from the lactam by the ring opening thereof:

—NH—E—CO—   (VIII)

with E denoting the hydrocarbon chain of the lactam. The possibility of obtaining a Tg as low as possible and, as a result, the ability to have high flexibility and elasticity, are contributed by the ether blocks; by an "ether block" there is intended essentially the concatenation of segments of the formula (IX) which are derived from the condensation of one molecule of polyoxyalkylenediamine with one molecule of dimer acid:

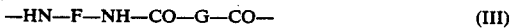

—HN—F—NH—CO—G—CO—   (III)

with F and G denoting the organic residues joining the functional groups of the polyoxyalkylenediamine and the dimer acid. The triamine, when it is employed, will play a minor role in the formation of the amide blocks and/or the ether blocks, depending upon its structure. In the case of the polyoxyalkylenetriamines, for example, the triamine takes part in the formation of the ether blocks alone.

The flexibility and the elasticity of the polymer obtained can be varied over wide limits by modifying the respective proportions of the amide blocks and the ether blocks in the final copolyetheramide. A good compromise in respect of crystallinity, flexibility and elasticity may be found for weight proportions of amide blocks in the final polymer of from 15 to 85% and preferably from 40 to 60% and for weight proportions of ether blocks of from 85 to 15% and preferably from 60 to 40%. The quantities of reactants employed (lactam and salt of fatty acid dimer and amino compound) are determined, of course, as to provide a copolyetheramide having such weight proportions of amide blocks and ether blocks. To calculate these weight proportions it is considered, in the absence of a triamine, that the amide blocks are derived directly from the initial lactam and that the ether blocks are derived from the salt of a dimer acid and a diamine containing ether bridges which is employed, by the loss of two moles of water per mole of salt; in the presence, for example, of a polyoxyalkylenetriamine it is considered that the amide blocks are still derived from the starting lactam, while the ether blocks are derived from the salt of dimer acid and of the mixture of diamine containing ether bridges with the triamine containing ether bridges by the loss of one mole of water per COOH group reacting with a NH$_2$ group originating from the combination of the polyamines.

It has unexpectedly been found that to have both the good compromise just discussed and high melt viscosities it is essential to carry out the polycondensation in the presence of the catalyst which has been specified above in the present description.

Finally, the copolyetheramides obtained have a good thermo-mechanical resistance which is due to their high melting points ranging from 170° C. to approximately 240° C. They have a Tg, measured at ZHE, which can attain values below $-50°$ C., which endows them with a flexibility and an elasticity (which can be adjusted by modifying the proportions of ether blocks) which can be maintained at temperatures as low as those from $-20°$ C. to $-40°$ C. Their high melt viscosity, measured under the conditions specified above, ranging from 500 poises to 10,000 poises and even higher, also endows them with an excellent capacity for injection molding and extrusion. Being perfectly homogeneous, they have, furthermore, good transparency. Various applications which rely on the specific qualities of these copolyetheramides may be envisaged in fields as varied as the engineering and building industries, the motor vehicle industry and household appliances.

In order to further illustrate the present invention and the advantages thereof, the following specific examples are given, it being understood that same are intended only as illustrative and in nowise limitative.

A number of control tests were carried out in the examples to follow. Similarly, various properties were measured. The operating procedures and/or the standards according to which these control tests and measurements were carried out are indicated below.

(1) Determination of the pH of the salt solutions: of a pH-meter designated Radiometer PHM 62, standardized to one hundredth of a pH unit.

(2) Microcalorimetric analysis:

The polymers were characterized by melting characteristics such as the melting endotherms Em and the crystallization exotherms Ec.

These determinations were carried out on a sample subjected to temperature changes of 10° C./min both on heating and on cooling.

In this manner, a differential microcalorimetry curve was established on which it was possible to discern the melting point (Tm) and the crystallization point (Tc) on cooling. The difference between Tm and Tc defines the supercooling Δ, which characterizes nucleation. Another crystallization characteristic connected with the rate of growth of the crystallites, tan α was determined; α is the angle formed by the horizontal of the baseline with the initial part of the peak of the crystallization exotherm on cooling (the horizontal of the baseline and the crystallization exotherm peak being determined on the curve produced by differential microcalorimetry).

(3) Glass transition:

The glass transition temperature (Tg) corresponds to the abrupt drop in the shear modulus as a function of temperature. It can be determined on the diagram reflecting the changes in the torsion modulus as a function of temperature, changes which were measured by thermomechanical analysis by means of an automatic torsion pendulum.

(4) Torsion shear modulus:

This was determined at two temperatures: at −20° C. and at +20° C., by means of an automatic torsion pendulum at a frequency on the order of 1 hertz according to the ISO standard R 537. The specimens were conditioned at ZHE, namely, they were placed in a desiccator over silica gel and dried for 24 hours at ambient temperature at $0.66-1.33 \cdot 10^2$ Pa before the measurements were carried out. The results are expressed in MPa.

In the examples which follow, when reference is made to the dimer acid employed, a compound was used marketed by Unichema Chemie under the trademark Pripol 1010, in which the difunctional acid fraction was greater than 95% by weight. This difunctional acid fraction consists of a mixture of isomers containing 36 carbon atoms, the predominant species of which is a saturated compound of the formula:

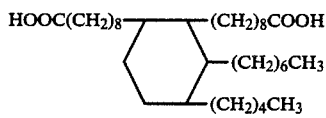

The monofunctional acid fraction (the weight content of which will be specified hereinafter) consists essentially of oleic acid; as for the fraction of acid having a functionality greater than 2 (the weight content of which will also be specified hereinafter), this consists essentially of a mixture of isomeric trimers containing 54 carbon atoms; the average molecular weight of this dimer acid was on the order of 565.

Prior to setting forth the examples, an illustration will be given, in the Test 1 below, of what happens when the teaching of the prior art is used, particularly that of U.S. Pat. No. 4,218,351. Test 2 below describes the results obtained when a method is used for adjusting the stoichiometry in accordance with the teaching of French Application No. 83/10,939, but with the polymerization being carried out in the absence of a catalyst.

TEST 1

The apparatus consisted of a 1 liter autoclave fitted with:
(i) a heating system employing a heat-transfer fluid,
(ii) a helical band stirrer (speed: 10 revolutions/min to 75 revolutions/min),
(iii) a distillation column,
(iv) a system permitting pressurization with nitrogen, and
(v) a circuit permitting the volatile products to be condensed and collected, connected to the head and to the base of the distillation column.

Into the autoclave, preheated to 75° C., were introduced:
(i) pure caprolactam: 250 g;
(ii) fatty acid dimer marketed under the trademark Pripol 1010 by Unichema Chemie, having a monomer content of 0.03% and a trimer content of 3% by weight and having an acidity of from 3.43 meq/g to 3.50 meq/g: 55.4 g;
(iii) polyoxypropylenediamine marketed by Texaco under the trademark Jeffamine D 2000, having a basicity of from 0.96 meq/g to 0.98 meq/g: 198 g; and
(iv) antioxidant marketed under the trademark Irganox 1010 by Ciba Geigy: 0.5 g.

Acidity of the dimer acids: this was determined by potentiometric titration of a solution of dimer acid in methanol (0.25 g of dimer acid per 80 cm³ of methanol) with a 0.1 N aqueous solution of sodium hydroxide.

Basicity of the polyoxypropylenediamines: this was determined by potentiometric titration of a solution of the diamine in a 50/50 (by volume) water/methanol mixture (0.5 g to 1 g of diamine per 80 cm³ of the solvent mixture) with a 0.1 N aqueous solution of hydrochloric acid.

The reaction mixture was homogenized for 15 minutes and three nitrogen purges were carried out by pressurizing to $3 \cdot 10^5$ Pa, followed by decompression. With the column set to total reflux, the temperature of the mixture was raised to 175° C. over 30 minutes, and then the mixture was maintained stirred for 150 minutes at 175° C.

The temperature of the mixture was then gradually raised to 230° C. over approximately 30 minutes while the reaction water was distilled off uniformly. Distillation was continued for 2 hours while the temperature of the reaction mixture was maintained at 230° C.

A pressure of $26.7 \cdot 10^2$ Pa was then applied gradually over 60 minutes, while the temperature of the mixture was maintained at 230° C. The mixture was homogenized at 230° C. for 30 minutes under a pressure of $26.7 \cdot 10^2$ Pa. Stirring was terminated, and then a nitrogen pressure of $3 \cdot 10^5$ Pa was produced in the autoclave and the polymer was withdrawn. The very fluid polymer extruded from the autoclave was collected on a tray. It was allowed to cool under protection from moisture and it was then cut into small pieces which were stored protected from moisture.

The product obtained was transparent, slightly yellow in color and had a melt viscosity, measured at 230° C. under a shear gradient $\gamma = 10$ s$^{-1}$ of less than 75 poises.

TEST 2

1. Preparation of the salt of a polyoxypropylenediamine of a molecular weight of 2,065 and of the fatty acid dimer in solution containing 33.33% by weight in a 50/50 (by weight) water/caprolactam mixture:

The following materials were charged under stirring into a 10 liter round-bottomed glass flask fitted with a propeller stirrer (three blades; speed of rotation: 100 revolutions/min) and a dropping funnel and capable of operating under a nitrogen atmosphere:
(i) demineralized water: 150 g;
(ii) caprolactam: 1,500 g;

(iii) polyoxypropylenediamine having a molecular weight equal to 2,065, marketed by BASF under the trademark Etherdiamine 2000: 1,165 g.

The mixture was homogenized for approximately one hour and the free space in the flask was purged with nitrogen.

335 g of fatty acid dimer marketed under the trademark Pripol 1010 by Unichema Chemie and having a monomer content of 0.03% and a trimer content of 3% were added to the stirred solution by being poured therein at a uniform rate over approximately 30 minutes. The solution was homogenized for 30 minutes.

A small sample of approximately 10 cm$^3$ was taken, which was diluted with a water/isopropanol mixture (42.85/57.15 by weight), such as to adjust the concentration of the salt of the acid dimer and of the polyoxypropylenediamine to 10% by weight. The pH value at 20° C. of this diluted solution was lower than that of the pH at the equivalence point.

27.6 g of a solution of polyoxypropylenediamine at a strength of 33.3% by weight in a water/caprolactam mixture (50/50 by weight) were introduced into the concentrated solution. The solution was homogenized for 30 minutes, and then a pH measurement was again made on a solution diluted to a salt concentration of 10% as previously. The pH value of the diluted solution attains, within plus or minus 0.05 of a pH unit, that of the pH at the equivalence point.

The concentrated solution, adjusted in this manner, was stored at 25° C. under a nitrogen atmosphere.

2. Preparation of a caprolactam/dimer acid-polyoxypropylenediamine copolyetheramide having a molecular weight of 2,065, of a weight composition in the region of 50/50 (amide blocks/ether blocks) by using a salt of dimer acid and of polyoxypropylenediamine, the stoichiometry of which had been established by the method of French Application No. 83/10,939 and by carrying out the polymerization in the absence of an oxyacid having an ionization constant pKa in water at 25° C. lower than or equal to 4:

The apparatus consisted of a 7.5 liter autoclave fitted with:
(i) a heating system employing a heat-transfer fluid,
(ii) a helical band stirrer (speed: 60 revolutions/min),
(iii) a system permitting pressurization with nitrogen, and
(iv) a circuit permitting the volatile products to be condensed and collected.

Into the autoclave, preheated to 75° C., were introduced:
(i) a solution of the salt of the acid dimer and of a polyoxypropylenediamine having a molecular weight of 2,065 at a concentration of 33.33% by weight in a 50/50 (by weight) water/caprolactam mixture from Test 2, part 1: 4,400 g;
(ii) aqueous solution of caprolactam at a concentration of 60% by weight: 1,150 g;
(iii) antioxidant marketed under the trademark Irganox 1010 by Ciba Geigy: 14.7 g; and
(iv) silicone antifoaming agent: 0.5 cm$^3$.

The mixture was allowed to homogenize for 15 minutes and three nitrogen purges were carried out by pressurization to 3.10$^5$ Pa, followed by decompression. The temperature of the stirred mixture was gradually raised to 150° C. over approximately 90 minutes while a uniform distillation of the water was ensured. The temperature of the mixture was maintained at about 150° C. until the weight of the distillate reached 1,782 g (92.5% of the water in the solutions).

The temperature of the mixture was then gradually raised to 250° C. over 45 minutes. The temperature of the stirred mixture was maintained at 250° C. for one hour.

A pressure of 66.7.10$^2$ Pa was then gradually applied over 40 minutes while the mixture was maintained homogenized at 250° C. The mixture was homogenized at 250° C. for 1 hour at a pressure of 66.7.10$^2$ Pa. 720 g of caprolactam were collected by distillation during the reaction stage under reduced pressure.

Stirring was terminated, and then a nitrogen pressure 3.10$^5$ Pa was produced in the autoclave and the polymer was withdrawn. The very fluid polymer extruded from the autoclave was collected in cold water and was then cut and dried.

The polymer obtained was transparent, pale yellow in color, and had the following characteristics, measured after drying:
(i) Melt viscosity at 230° C. under a shear gradient $\gamma = 10s^{-1}$: 480 poises;
(ii) Melting point (Tm): 210.5° C.;
(iii) Crystallization point on cooling (Tc): 153° C.;
(iv) $\Delta = Tm - Tc$: 57.5° C.;
(v) Tan $\alpha$: 20.

EXAMPLE 1

This example illustrates the modification of the process of French Application No. 83/10,939, consisting in the use of a polyoxyalkylenediamine mixed with a triamine. 1. Preparation of the salt of a fatty acid dimer and of a mixture of polyoxypropylenediamine having a molecular weight of 2,065 and of polyoxypropylenetriamine having a molecular weight of 450, in solution at a concentration of 33.33% by weight in a 50/50 (by weight) water/caprolactam mixture:

The following materials were charged, under stirring, into a 10 liter round glass flask fitted with a propeller stirrer (three blades; speed of rotation: 100 revolutions/min) and a dropping funnel and capable of operating under a nitrogen atmosphere:
(i) demineralized water: 1,500 g;
(ii) pure caprolactam: 1,500 g;
(iii) polyoxypropylenediamine having a molecular weight equal to 2,065, marketed by BASF under the trademark Etherdiamine 2000: 1,168.5 g;
(iv) polyoxypropylenetriamine of the formula (II) in which the sum of $x + y + z$ was in the region of 5.3, having a molecular weight of 450, marketed by Texaco under the trademark Jeffamine T 403: 8.5 g.

The mixture was homogenized for approximately one hour and the free volume in the flask was purged with nitrogen.

323 g of fatty acid dimer marketed under the trademark Pripol 1010 by Unichema Chemie, with a monomer content of 0.03% and a trimer content of 3%, were added to the stirred solution by being run therein at a uniform rate over approximately 30 minutes. The solution was homogenized for 30 minutes.

A small sample of approximately 10 cm$^3$ was taken, which was diluted with a water/isopropanol mixture (42.85/57.15 by weight) such as to adjust the concentration of the salt of the dimer acid and of the polyoxypropyleneamines to 10% by weight. The pH value at 20° C. of this diluted solution was higher than that of the pH at the equivalence point.

27 g of the fatty acid dimer and 54 g of a 50% strength aqueous solution of caprolactam were added to the concentrated solution. The solution was homogenized for 30 minutes and then another pH measurement was made on a solution diluted to 10% salt concentration as before. The pH value of the diluted solution attained, to within plus or minus 0.05 of a pH unit, that of the pH at the equivalence point.

The concentrated solution, adjusted in this manner, was stored at 25° C. under a nitrogen atmosphere.

2. Preparation of a caprolactam/dimer acid-polyoxypropylenediamine copolyetheramide having a molecular weight of 2,065-polyoxypropylenetriamine having a molecular weight of 450, of a weight composition in the region of 50/50 (amide blocks/ether blocks) and with a triamine content in the region of 6.3 millimoles/kg:

The apparatus consisted of a 7.5 liter autoclave fitted with:
(i) a heating system employing a heat-transfer fluid,
(ii) a helical band stirrer (speed: 60 revolutions/min),
(iii) a system permitting pressurization with nitrogen, and
(iv) a circuit permitting the volatile products to be condensed and collected.

Into the autoclave, preheated to 75° C., were introduced:
(i) solution of the salt of the dimer acid and of polyoxypropyleneamines at a concentration of 33.33% by weight in a 50/50 (by weight) water/caprolactam mixture from Example 1, part 1: 4,500 g;
(ii) aqueous caprolactam solution at a concentration of 60% by weight: 475 g;
(iii) antioxidant marketed under the trademark Irganox 1010 by Ciba Geigy: 15 g;
(iv) hypophosphorous acid in aqueous solution at a concentration of 50% by weight: 3 g; and
(v) silicone antifoaming agent (0.5 cm$^3$).

The mixture was allowed to homogenize for 15 minutes and three nitrogen purges were carried out by pressurization to $3.10^5$ Pa, followed by decompression. The temperature of the stirred mixture was gradually raised to 150° C. over approximately 90 minutes while uniform distillation of the water was ensured. The temperature of the mixture was maintained at about 150° C. until the weight of the distillate reached 1,565 g (92.5% of the water in the solution).

The temperature of the mixture was then gradually raised to 250° C. over 45 minutes. The temperature of the stirred mixture in the autoclave was maintained at 250° C. for one hour.

A pressure of $72.10^2$ Pa was then gradually produced over 40 minutes while the mixture was maintained homogenized at 250° C. The mixture was homogenized at 250° C. for one hour at a pressure of $72.10^2$ Pa. 330 g of caprolactam were collected by distillation during the reaction stage under reduced pressure.

Stirring was terminated and then a nitrogen pressure of $5.10^5$ Pa was produced in the autoclave and the polymer was withdrawn. The latter, extruded from the autoclave in lace form, was cooled by passage through a cold water bath and was then granulated and dried.

The polymer obtained was transparent, slightly opalescent and almost colorless.

It had the following characteristics, measured on the dry granules:
(i) Melting point (Tm): 210° C.;
(ii) Crystallization point on cooling (Tc): 145° C.;
(iii) $\Delta = Tm - Tc$: 65° C.;
(iv) Tan $\alpha$: 13;
(v) Melt viscosity at 230° C. under a shear gradient $\gamma = 10$ s$^{-1}$: 13,000 poises.

The physical and mechanical characteristics, measured on injection-molded, conditioned specimens were as follows:
(i) Glass transition temperature at ZHE: $-69°$ C.;
(ii) Torsional modulus at ZHE:
   at $+20°$ C.: 54 MPa
   at $-20°$ C.: 110 MPa.

EXAMPLE 2

Preparation of a caprolactam/dimer acid-polyoxypropylenediamine having a molecular weight of 2,065-polyoxypropylenetriamine having a molecular weight of 450 copolyetheramide, of weight composition in the region of 50/50 (amide blocks/ether blocks) and having a triamine content in the region of 2.5 millimoles/kg:

The operation was carried out following the general operating procedure of Example 1, part 2, but using the following charges:
(i) solution of the salt of the dimer acid and of the mixture of polyoxypropylenediamine and of polyoxypropylenetriamine at a concentration of 33.33% by weight in a 50/50 (by weight) water/caprolactam mixture as prepared in Example 1, part 1: 1,785 g;
(ii) solution of the salt of the dimer acid and of polyoxypropylenediamine at a concentration of 33.33% by weight in a 50/50 (by weight) water/caprolactam mixture, as prepared in Test 2, part 1: 2,715 g;
(iii) aqueous solution of caprolactam at a concentration of 60% by weight: 475 g;
(iv) antioxidant marketed under the trademark Irganox 1010 by Ciba Geigy: 15 g;
(v) hypophosphorous acid in aqueous solution at a concentration of 50% by weight: 3 g; and
(vi) silicone antifoaming agent: 0.5 cm$^3$.

320 g of caprolactam were collected by distillation during the reaction stage under reduced pressure.

The transparent, slightly opalescent, almost colorless polymer obtained had the following characteristics, measured on dry granules:
(i) Melting point (Tm): 210° C.;
(ii) Crystallization point on cooling (Tc): 148° C.;
(iii) $\Delta = Tm - Tc$: 62° C.;
(iv) Tan $\alpha$: 21;
(v) Melt viscosity at 230° C. under a shear gradient $\gamma = 10$ s$^{-1}$: 5,000 poises.

EXAMPLE 3

This example also illustrates a modification of the process of French Application No. 83/10,939, consisting in carrying out the adjustment of the stoichiometry of the solution of the salt of a fatty dimer acid and of a polyoxyalkyleneamine in the presence of the catalyst.

1. Preparation of the salt of the fatty dimer acid and of a polyoxypropylenediamine having a molecular weight of 2,072 in solution at a concentration of 33.33% by weight in a 50/50 (by weight) water/caprolactam mixture, in the presence of phenylphosphonous acid [$C_6H_5P(O)HOH$]:

The following materials were charged, under stirring, into a 10 liter round glass flask equipped as that described in Example 1:
(i) demineralized water: 1,490 g;
(ii) pure caprolactam: 1,525 g;

(iii) polyoxypropylenediamine having a molecular weight of 2,072, marketed by Texaco under the trademark Jeffamine D 2000: 1,205 g; and (iv) aqueous solution of phenylphosphonous acid at a concentration of 20%: 44 g.

The mixture was homogenized for approximately one hour and the free volume of the round flask was purged with nitrogen.

320 g of fatty acid dimer marketed under the trademark Pripol 1010 by Unichema Chemie, having a monomer content of 0.03% and a trimer content of 3%, were introduced into the stirred solution by being uniformly run therein over approximately 30 minutes. The solution was homogenized for 30 minutes.

A small sample of approximately 10 cm$^3$ was taken and diluted with a water/isopropanol mixture (42.85/57.15 by weight) such as to adjust the concentration of the salt of the dimer acid and of the polyoxypropylenediamine to 10% by weight. The pH value at 20° C. of this diluted solution was lower than that of the pH at the equivalence point.

45.9 g of a solution of polyoxypropylenediamine at a concentration of 33.33% by weight in a 50/50 (by weight) water/caprolactam mixture were introduced into the concentrated solution. The solution was homogenized for 30 minutes and then another pH measurement was carried out on a solution diluted to 10% salt concentration as before. The pH value of the diluted solution attained, to within plus or minus 0.05 of a pH unit, that of the pH at the equivalence point.

The concentrated solution, adjusted in this manner, was stored at 25° C. under a nitrogen atmosphere. 2. Preparation of a caprolactam/dimer acid-polyoxypropylenediamine having a molecular weight of 2,072 copolyetheramide, of weight composition in the region of 50/50 (amide blocks/ether blocks).

Into the autoclave as described in Example 1, part 2, preheated to 75° C., were introduced:

(i) solution of the salt of the dimer acid and of the polyoxypropylenediamine of part 1, prepared at 33.33% concentration by weight in a 50/50 (by weight) water/caprolactam mixture in the presence of phenylphosphonous acid: 4,500 g;

(ii) aqueous solution of caprolactam at a concentration of 60% by weight: 550 g; and (iii) silicone antifoaming agent: 0.5 cm$^3$ The mixture was allowed to homogenize for 15 minutes and three nitrogen purges were carried out by pressurization to 3.10$^5$ Pa, followed by decompression. The temperature of the stirred mixture was raised to 115° C. over 30 minutes under autogenous pressure. The pressure attained was 2/10$^5$ Pa (absolute pressure).

1,485 g of water were distilled at a uniform rate over one hour under this pressure, while the temperature of the mixture increased gradually during this time up to 137° C. The pressure was released down to atmospheric pressure over 10 minutes while the temperature of the mixture was raised to 150° C. During this stage, 160 g of distillate were collected.

The temperature of the mixture was then raised gradually to 250° C. over one hour. The temperature of the stirred mixture was maintained at 250° C. for one hour at atmospheric pressure.

A pressure of 66·10$^2$ Pa was then produced gradually over one hour while the mixture was maintained homogenized at 250° C. The mixture was homogenized at 250° C. for 20 minutes at a pressure of 66·10$^2$ Pa. 360 g of caprolactam were collected by distillation during the reaction stage under reduced pressure.

Stirring was terminated and then a nitrogen pressure of 7·10$^5$ Pa was produced in the autoclave and the polymer was withdrawn. The latter, extruded from the autoclave in lace form, was cooled by passage through a cold water bath and was then granulated and dried.

The polymer obtained was transparent, slightly opalescent and colorless.

It had the following characteristics, measured on dry granules:

(i) Melting point (Tm): 209.5° C.;
(ii) Crystallization point on cooling (Tc): 142.5° C.;
(iii) $\Delta = tm - Tc$: 67° C.;
(iv) Tan $\alpha$; 10.5;
(v) Melt viscosity at 230° C. under a shear gradient $\gamma = 10\ s^{-1}$: 55,000 poises.

EXAMPLE 4

This example also illustrates a modification of the process of French Application No. 83/10,939, consisting in using a catalyst based on an alkali metal salt of an oxyacid.

1. Preparation of the salt of a polyoxypropylenediamine having a molecular weight of 2,072 and of the fatty acid dimer in solution at a concentration of 33.33% by weight in a 50 (by weight) water/caprolactam mixture:

The dimer acid and the polyoxypropylenediamine of Example 3 were used to prepare this solution in accordance with the general operating procedure described in Test 2, part 1.

2. Preparation of a caprolactam/dimer acid-polyoxypropylenediamine having a molecular weight of 2,072 copolyetheramide, of weight composition in the region of 50/50 (amide blocks/ether blocks) in the presence of sodium phenyl phosphonite [$C_6H_5P(O)HONa$]:

The operation was carried out according to the procedure of Example 3, part 2, using the following charges:

(i) solution of the salt of the dimer acid and of the polyoxypropylenediamine of part 1, prepared at a concentration of 33.33% by weight in a 50/50 (by weight) water/caprolactam mixture: 4,500 g;

(ii) aqueous solution of caprolactam at a concentration of 66%: 540 g;

(iii) 20% concentration aqueous solution of sodium phenyl phosphonite: 45 g; and (iv) silicone antifoaming agent: 0.5 cm$^3$.

The quantity of caprolactam collected during the reaction stage under reduced pressure was 440 g.

The polymer withdrawn under nitrogen pressure, after the final polymerization stage of 20 minutes at 250° C. at a pressure of 66·10$^2$ Pa, was transparent, slightly opalescent and colorless.

It had the following characteristics, measured on dry granules:

(i) Melting point (Tm): 208° C.;
(ii) Crystallization point on cooling (Tc): 150° C.;
(iii) $\Delta = Tm - Tc$: 58° C.;
(iv) Tan $\alpha$: 18;
(v) Melt viscosity at 230° C. under a shear gradient $\gamma = 10\ s^{-1}$: 50,000 poises.

A comparison of the characteristics of the copolyetheramides of Examples 3 and 4 evidences the favorable effect of the catalyst based on a strong acid salt on the crystallizability of the polyetheramide: for a melt viscosity of the same order, the supercooling was reduced by 9° C. and tan α was multiplied by a factor of 1.7 when phenylphosphonous acid was replaced by its sodium salt.

EXAMPLE 5

This example illustrates the embodiment of the invention which combines the use of a triamine in the composition of the parent reactants of the copolyetheramide and the use of an oxyacid salt as a catalyst during the polymerization.

Preparation of a caprolactam/dimer acid-polyoxypropylenediamine having a molecular weight of 2,065-polyoxypropylenetriamine of molecular mass 450 copolyetheramide, of weight composition in the region of 50/50 (amide blocks/ether blocks), with a triamine content in the region of 2.5 millimoles/kg, polymerized in the presence of sodium phenylphosphonite.

The operation was carried out according to the general operating procedure of Example 1, part 2, but using the following charges:

(i) solution of the salt of the dimer acid and of the mixture of polyoxypropylenediamine of polyoxypropylenetriamine at a concentration of 33.33% by weight in a 50/50 (by weight) water/caprolactam mixture as prepared in Example 1, part 1: 1,785 g;
(ii) solution of the salt of the dimer acid and of polyoxypropylenediamine at a concentration of 33.33% by weight in a 50/50 (by weight) water/caprolactam mixture, as prepared in Test 2, part 1: 2,715 g;
(iii) aqueous solution of caprolactam at a concentration of 60% by weight: 475 g;
(iv) a 20% concentration aqueous solution or sodium phenylphosphonite: 7.5 g; and
(v) silicone antifoaming agent: 0.5 cm³.

320 g of caprolactam were collected during the polymerization stage under reduced pressure. The polymer obtained was transparent, slightly opalescent and colorless.

It had the following characteristics, measured on dry granules:
(i) Melting point (Tm): 210° C.;
(ii) Crystallization point on cooling (Tc): 153° C.;
(iii) Δ=Tm−Tc: 57° C.;
(iv) Tan α: 25;
(v) Melt viscosity at 230° C. under a shear gradient γ=10 s⁻¹: 8,000 poises.

While this invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A homogeneous, flexible block copolyetheramide having a melting/softening point of at least 170° C., a glass transition temperature, measured at zero percent relative humidity, of at most −5° C., and a melt viscosity of at least 500 poises, said block copolyetheramide comprising a polycondensate produced in the presence of a catalyst selected from the group consisting of (a) an oxyacid having at least one acid function which has a pKa of not greater than 4 and selected from the group consisting of strong inorganic oxyacids and strong organic oxyacids other than carboxylic acids and (b) an alkali or alkaline earth metal salt of said oxyacid (a), and wherein said polycondensate is of an admixture of (i) a lactam having from 4 to 12 carbon atoms with (ii) a solution of (iii) a salt of a fatty acid dimer and a mixture of polyoxyalkylenediamine and a triamine in (iv) a solvent medium which comprises (1) a mixture of water and an aliphatic alcohol having less than than 5 carbon atoms, (2) a water/alcohol/lactam mixture wherein the alcohol and lactam are as defined above, (3) a melt of said lactam, or (4) a mixture of water and a water-soluble lactam, the stoichiometry of said salt (iii) having been adjusted such that the pH thereof is essentially that as exists at the equivalence point thereof.

2. The block copolyetheramide as defined by claim 1, said solvent medium (iv) itself comprising said lactam (i).

3. The block copolyetheramide as defined by claim 1, said stoichiometry having been preliminarily adjusted via pH measurement of a solution of said salt in a solvent mixture comprising water and at least one aliphatic alcohol, aliphatic diol or lactam, with said alcohol and said lactam being defined as in (iv) and said diol having from 2 to 6 carbon atoms.

4. A homogeneous, flexible block copolyetheramide having a melting/softening point of at least 170° C., a glass transition temperature, measured at zero percent relative humidity, of at most −5° C., and a melt viscosity of at least 500 poises, said block copolyetheramide comprising a polycondensate which has been produced in the presence of a catalyst which is an alkali or alkaline earth metal salt of an oxyacid having at least one acid function which has pKa of not greater than 4 and selected from the group consisting of strong inorganic oxyacids and strong organic oxyacids other than carboxylic acids, and wherein said polycondensate is of an admixture of (i) a lactam having from 4 to 12 carbon atoms with (ii) a solution of (iii) a salt of a fatty acid dimer and a polyoxyalkylenediamine in (iv) a solvent medium which comprises (1) a mixture of water and an aliphatic alcohol having less than 5 carbon atoms, (2) a water/alcohol/lactam mixture wherein the alcohol and lactam are as defined above, (3) a melt of said lactam, or (4) a mixture of water and a water-soluble such lactam, the stoichiometry of said salt (iii) having been adjusted such that the pH thereof is essentially that as exists at the equivalence point thereof.

5. The block copolyetheramide as defined by claim 4, said solvent medium (iv) itself comprising said lactam (i).

6. The block copolyetheramide as defined by claim 4, said stoichiometry having been preliminarily adjusted via pH measurement of a solution of said salt in a solvent mixture comprising water and at least one aliphatic alcohol, aliphatic diol or lactam, with said alcohol and said lactam being defined as in (iv) and said diol having from 2 to 6 carbon atoms.

7. The block copolyetheramide as defined by claims 1 or 4, said catalyst having been added to said salt (iii) prior to adjustment of the stoichiometry thereof.

8. The block copolyetheramide as defined by claim 1, wherein said triamine is bishexamethylenetriamine of the formula, $H_2N-(CH_2)_6-NH-(CH_2)_6-NH_2$, or a polyoxyalkylenetriamine corresponding to the general formula:

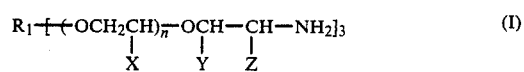
(I)

in which $R_1$ is the trivalent residue of a an aliphatic triol containing from 3 to 10 carbon atoms; Z is a straight or branched-chain alkyl radical containing 1 to 18 carbon atoms; X and Y, which are identical or different, are each a hydrogen atom or a radical Z; and the symbol n is an average number ranging from 0 to 50.

9. The block copolyetheramide as defined by claim 7, wherein said triamine is bishexamethylenetriamine of the formula, $H_2N-(CH_2)_6-NH-(CH_2)_6-NH_2$, or a polyoxyalkylenetriamine corresponding to the general formula:

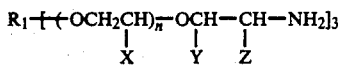

(I)

in which $R_1$ is the trivalent residue of a an aliphatic triol containing from 3 to 10 carbon atoms; Z is a straight or branched-chain alkyl radical containing 1 to 18 carbon atoms; X and Y, which are identical or different, are each a hydrogen atom or a radical Z; and the symbol n is an average number ranging from 0 to 50.

10. The block copolyetheramide as defined by claim 8, said triamine having the formula (I) wherein Z is methyl, X is Z, Y is hydrogen and n has an average value ranging from 1 to 16.

11. The block copolyetheramide as defined by claim 9, said triamine having the formula (I) wherein Z is methyl, X is Z, Y is hydrogen and n has an average value ranging from 1 to 16.

12. The block copolyetheramide as defined by claim 10, said triamine being a polyoxypropylenetriamine having the formula:

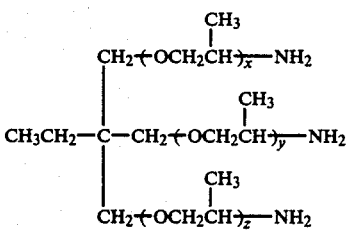

(II)

in which the symbols x, y and z are each an average number ranging from 1 to 10, with the sum of x+y+z ranging from 3 to 30.

13. The block copolyetheramide as defined by claim 11, said triamine being a polyoxypropylenetriamine having the formula:

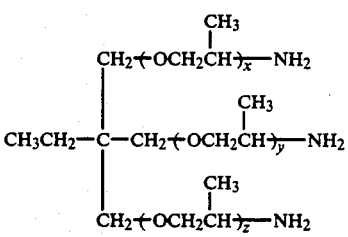

(II)

in which the symbols x, y and z are each an average number ranging form 1 to 10, with the sum of x+y+z ranging from 3 to 30.

14. The block copolyetheramide as defined by claim 1, wherein the proportion of said triamine, expressed as the number of millimoles of triamine per 1 kilogram of product copolyetheramide, ranges from 0.1 to 20.

15. The block copolyetheramide as defined by claim 1, wherein said oxyacid is selected from the group consisting of hypophosphorous, phosphorous, orthophosphoric or pyrophosphoric acid; or an organosulfonic acid of the formula $R_2-SO_3H$ (III) in which $R_2$ is a straight or branched-chain alkyl radical containing from 1 to 6 carbon atoms, a phenyl radical, a phenylalkyl radical containing from 1 to 3 carbon atoms in the alkyl moiety, or a naphthyl radical; or an organophosphonic acid of the formula $R_3-P(O)(OH)_2$ (IV) in which $R_3$ is an alkyl radical, a phenyl radical or a phenylalkyl radical, said radicals being as above defined under $R_2$; or an organophosphinic acid of the formula $R_4R_5-P(O)(OH)$ (V) in which $R_4$ and $R_5$, which are identical or different, are each a straight chain alkyl radical containing from 1 to 3 carbon atoms, a phenyl radical or a phenylalkyl radical also being as above defined under $R_2$; or an organophosphonous acid of the formula $R_6H-R(O)(OH)$ (VI) in which $R_6$ is a straight or branched-chain alkyl radical containing from 1 to 4 carbon atoms, with the proviso that the radical is not branched when it is an alkyl radical containing 4 carbon atoms, a phenyl radical or a phenylalkyl radical also being as above defined under $R_2$.

16. The block copolyetheramides as defined by claim 15, said oxyacid is hypophosphorous, phosphorous, orthophosphoric, pyrophosphoric, methylphosphonic, phenylphosphonic, benzylphosphonic, dimethylphosphinic, diphenylphosphinic, methylphenylphosphinic, dibenzylphosphinic, methylphosphonous, phenylphosphonous or benzylphosphonous acid.

17. The block copolyetheramide as defined by claim 15, said catalyst comprising a sodium or potassium salt of at least one of said oxyacids.

18. The block copolyetheramide as defined by claim 4, said catalyst comprising a sodium or potassium salt.

19. The block copolyetheramide as defined by claims 1 or 4, the amount by weight of said catalyst ranging from 0.01 to 1%.

20. The block copolyetheramide as defined by claims 1 or 4, said lactam comprising ε-caprolactam.

21. The block copolyetheramide as defined by claims 1 or 4, said polyoxyalkylenediamine having the general formula:

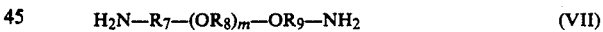

(VII)

in which $R_7$, $R_8$ and $R_9$, which are identical or different, are each a straight or branched-chain divalent saturated aliphatic radical containing from 1 to 10 carbon atoms, and the symbol m is a number as will provide a molecular weight ranging from 100 to 10,000.

22. The block copolyetheramide as defined by claim 21, said polyoxyalkylenediamine comprising a polyoxypropylenediamine of the formula (VII) in which

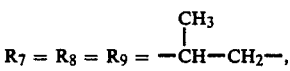

a polyoxyethylenediamine of the formula (VII) in which

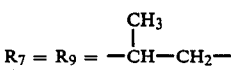

and $R_8=-CH_2-CH_2-$, or a polyoxytetramethylenediamine of the formula (VII) in which

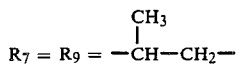

23. The block copolyetheramide as defined by claims 1 or 4, comprising from 15 to 85% by weight of amide blocks and from 85 to 15% by weight of ether blocks.

24. A shaped article comprising the block copolyetheramide as defined by claims 1 or 4.

25. The block copolyetheramide as defined by claim 15, wherein at least one of said phenyl radicals is substituted with 1 to 3 alkyl radicals containing from 1 to 3 carbon atoms.

26. The block copolyetheramide as defined by claim 15, wherein the benzene nucleus of at least one of said phenylalkyl radicals is substituted with 1 to 3 alkyl radicals containing from 1 to 3 carbon atoms.

27. The block copolyetheramide as defined by claim 15, wherein said naphthyl radical is substituted with 1 to 4 alkyl radicals containing from 1 to 3 carbon atoms.

* * * * *